United States Patent [19]

Tabata et al.

[11] Patent Number: 5,728,333
[45] Date of Patent: Mar. 17, 1998

[54] METHOD FOR MAKING AND THEN REMOVING A MOLDED ARTICLE OF RIGID POLYURETHANE FOAM FROM A MOLD

[75] Inventors: Keiichiro Tabata, Chigasaki; Yoichi Nabeshima, Zama; Taikyu Fujita, Yokohama; Kazufumi Yokoyama, Yokosuka; Torao Hashimoto, Yokohama, all of Japan

[73] Assignee: Bridgestone Corporation, Tokyo, Japan

[21] Appl. No.: 673,233

[22] Filed: Jun. 26, 1996

[30] Foreign Application Priority Data

Dec. 25, 1995 [JP] Japan ................... 7-350922

[51] Int. Cl.⁶ .................. B29C 44/02; B29C 41/42
[52] U.S. Cl. .............. 264/46.4; 264/46.8; 264/313; 264/334; 264/335; 264/338
[58] Field of Search ................ 264/45.2, 46.4, 264/46.8, 334, 335, 338, 313

[56] References Cited

U.S. PATENT DOCUMENTS 3,576,930  4/1971  Watters et al. ............... 264/45.2
4,956,141  9/1990  Allen et al. .................. 264/334
5,635,119  6/1997  Carson ........................ 264/338

FOREIGN PATENT DOCUMENTS 56-111644  9/1981  Japan .......................... 264/335
1699774   12/1991  U.S.S.R. ...................... 264/335

Primary Examiner—Allan R. Kuhns
Attorney, Agent, or Firm—Sughrue, Mion, Zinn, Macpeak & Seas, PLLC

[57] ABSTRACT

A molded article of rigid polyurethane foam is manufactured by using a mold of separable upper and lower mold sections mated to define a cavity therebetween. A film of polypropylene which is previously vacuum formed in conformity to the mold cavity is closely set within the cavity and secured to the lower mold section outside the cavity. A rigid polyurethane foam-forming raw material is introduced into the cavity and on the film and caused to foam and expand in place to mold an article of rigid polyurethane foam. Thereafter, the molded article is lifted together with the film from the mold cavity by a pneumatic pressure or ejector pin. The molded article is stripped from the film to remove only the molded article from the mold without taking the entire film out of the mold. The once lifted film is returned to the original shape by vacuum suction for replacing the film in the cavity.

12 Claims, 3 Drawing Sheets

METHOD FOR MAKING AND THEN REMOVING A MOLDED ARTICLE OF RIGID POLYURETHANE FOAM FROM A MOLD

BACKGROUND OF THE INVENTION

1. Field of the Invention

This invention relates to a method for manufacturing molded articles of rigid polyurethane foam which are useful as automotive interior articles and other industrial articles.

In the prior art, molded articles of rigid polyurethane foam are typically prepared by providing a mold consisting of separable upper and lower mold sections defining a cavity of desired shape, heating the mold, applying a mold release agent to the cavity surface, pouring a rigid polyurethane foam-forming raw material into the cavity of the lower mold section, and closing the cavity with the upper mold section or cover by clamping the mold sections to one another. The raw material is expanded and cured in conformity to the mold cavity shape. The upper mold section or cover is then opened for ejecting the molded article of rigid polyurethane foam. The mold cavity is then cleaned so that the mold is ready for a subsequent cycle of molding. The molded article is ready for use although it has the mold release agent deposited thereon. When it is desired to join an interior or exterior liner to the molded article, the mold release agent must be removed from the molded article.

Upon ejection of molded articles, problems arise in the above-mentioned prior art method. If a molded article of polyurethane foam is removed from the mold before it has been fully cured, a part, typically a projection of the article can be damaged due to bonding to the mold. Most often, a curing time of about 12 minutes is required at a curing temperature of 80° C.±10° C. although the exact curing time somewhat varies with the formulation of raw material and the size of molded articles.

In the case of ordinary plastic articles molded by injection molding or the like, it is a common practice to push up a molded article by means of an ejector pin built in the mold for facilitating ejection of the molded article. The molding of polyurethane foam, however, requires a cumbersome operation to periodically clean the gap between the mold and the ejector pin because polyurethane foam penetrates into the gap upon repetition of expanding and molding steps.

It is also known to use sheets or films for assisting in molding of foam bodies in molds. In this regard, a variety of proposals have been made as disclosed in Japanese Patent Application Kokai (JP-A) Nos. 66562/1975, 79568/1975, 151360/1977, 178012/1985, and 12581/1986. With these proposals, however, separation of the sheet from the molded article is difficult. Upon separation, the sheet is stretched to such an extent that the sheet is not reusable. In order to improve the separation between a sheet and a molded article, Japanese U.M. Publication No. 26085/1995 proposes to coat a sheet with a layer of silicone resin. The silicone coated sheet is effective for easy separation of a molded article, but is still stretched upon separation so that it become no longer usable after several tens of molding cycles. In all these molding methods using sheets, molded articles are ejected from the molds together with the sheets. These methods require some workers for separating the molded articles from the sheets after ejecting. It was thus impossible to reduce the number of workers needed in the ejection step of the molding process.

More particularly, JP-A 66562/1975 discloses a foam-in-place molding method comprising the steps of providing a first mold with a cavity whose shape is reverse to the outer shape of an article to be molded, placing on the first mold a thermoplastic resin film which will deform for close contact with the inner wall of the first mold cavity due to reaction heat and foaming pressure of a foamable raw material, admitting a shot of foamable raw material on the thermoplastic resin film, clamping a second mold to the first mold to seal the foamable raw material therebetween, causing the raw material to expand, thereby curing the raw material to the predetermined shape while pressing the thermoplastic resin film in close contact with the inner wall of the first mold cavity due to the foaming pressure, detaching the second mold from the first mold, ejecting the molded foam from the first mold, and finally removing the thermoplastic resin film from the molded foam. Since polyethylene is used as the film, some difficulty arises upon stripping of the film from the molded foam. The mold is generally heated at a temperature of about 50° to 60° C. for foam-in-place molding of polyurethane, and with this heat, a polyethylene film is in a softened, stretchable state. Whenever such a softened film is stripped from the molded article, it is stretched such that it is no longer reusable.

JP-A 79568/1975 discloses a foam-in-place molding method comprising the steps of providing a first mold with a cavity whose shape is reverse to the outer shape of an article to be molded, placing on the first mold a thermoplastic resin film which will deform for close contact with the inner wall of the first mold cavity due to reaction heat and foaming pressure of a foamable raw material, but is not bondable with the foamable raw material, admitting a shot of foamable raw material on the thermoplastic resin film, clamping a second mold to the first mold to seal the foamable raw material therebetween, causing the raw material to expand, thereby curing the raw material to the predetermined shape while pressing the thermoplastic resin film in close contact with the inner wall of the first mold cavity due to the foaming pressure, detaching the second mold from the first mold, and ejecting only the molded foam from the first mold while leaving the thermoplastic resin film in the first mold cavity. A film of polyethylene is used. Polyethylene films of 1 to 2 mm in gage can be used only a few cycles as described in the specification of JP-A 79568/1975. Although it is described that the film is left in the lower mold section cavity after molding, the film will be moved aside upon ejection of the molded article since the film is not secured to the lower mold section. A cumbersome step is needed to replace the film in alignment.

JP-A 151360/1977 discloses a method for preparing a foam body by laying a film of water-soluble resin on a foam release portion of the inner surface of a foaming mold, admitting a foam raw material thereon, and causing the raw material to expand. A film of water-soluble resin such as polyvinyl alcohol becomes integral with the resin foam, but can be dissolved away with water after molding. Since a film must be laid on the mold on every cycle, this method is cumbersome.

In the method of JP-A 178012/1985, a foam article is prepared by connecting a lower section of a foaming-in-place mold to a means for pumping compressed air, laying a releasable, gas-tight sheet on the lower mold section along its cavity surface, admitting a shot of a closed cell foam-forming synthetic resin liquid on the release sheet, mating an upper mold section with the lower mold section, causing the synthetic resin liquid to expand and cure to mold a foam body. With the upper mold section kept mated, the air pumping means is actuated for pumping compressed air to the release sheet from below for breaking the closed cells in the foam body. Then the upper old section is removed to open the mold cavity and the air pumping means is actuated again. With the aid of compressed air, the foam body is ejected from the mold together with the release sheet. Finally the sheet is stripped from the foam body. Since the release sheet used herein is a woven or non-woven fabric coated with a fluororesin or silicone resin which has a substantial gage as compared with resin films, the sheet cannot closely follow the cavity shape. In addition, the release sheet is less releasable from the molded foam and can be crushed upon ejection from the mold. There is disclosed no step of returning the sheet to the original shape. Although it is described that the release sheet is configured by press shaping, a woven or non-woven fabric coated with a fluororesin or silicone resin is low in elongation and not shapable to a complex profile. In addition, when pressed, the fluororesin and silicone resins are stretched and permanently deformed and set so that they are not reversible in configuration as are vacuum formed films.

Molding of foam bodies with such sheets indicates that the mold cavity is defined by the permanently set sheet. The sheet does not withstand repetitive uses. That is, the sheet tends to rupture at the permanently set portion since it is stretched as a result of repetitive uses. It is described in JP-A 178012/1985 that the foam body has closed cells which are broken by a pneumatic pressure. This patent is thus regarded as being directed to flexible polyurethane foam and cold curing thereof when applied to polyurethane foam. If the foam is a rigid polyurethane foam, rupture of closed cells will result in failure of a product. This indicates that what is contemplated in JP-A 178012/1985 is a flexible polyurethane foam. The flexible polyurethane foam is free of the problem that a molded body cannot be ejected from the mold, because it will deform upon ejection owing to its own flexibility. In the case of rigid polyurethane foam, forced ejection will cause a failure of the foam and it is thus difficult to eject the foam against the force of the foam urging the side wall of the mold.

JP-A 125815/1986 discloses a mold structure for polyurethane molding which is obtained by using a sheet of a material repellent to polyurethane such as polyethylene and polypropylene, blow or vacuum forming the sheet to a shape conformal to the cavity surface of a polyurethane molding mold to form a liner, and placing the liner on the mold cavity surface. The liner is secured to the mold over its entire surface by vacuum suction or adhesive bonding. A polyurethane raw material is expanded and molded on the liner. Then only the molded polyurethane foam is ejected from the mold since the liner is secured to the mold, prohibiting to eject the molded polyurethane foam and the liner at the same time. It is not contemplated to blow up the liner by feeding air through the port which is inherently utilized for vacuum suction.

Following the teaching of JP-A 125815/1986, we attempted polyurethane molding in a mold having a formed film of polypropylene secured thereto over its entire surface. The film withstood only a few cycles of polyurethane molding and thereafter, ejection of molded polyurethane foam was difficult unless a mold release agent was applied to the film. The inventors found that the problem arose from the overall attachment of a formed polypropylene film to a mold.

It is then desired to have a method for preparing a molded article of rigid polyurethane foam using a mold in combination with a plastic film which method enables easy reuse of the film and has advantages including a reduced curing time, a reduced mold occupying time, an increased number of molding shots per unit time, and increased productivity.

SUMMARY OF THE INVENTION

Therefore, an object of the present invention is to provide a method for preparing a molded article of rigid polyurethane foam using a mold in combination with a plastic film which method eliminates the extra step of separating the molded article from the plastic film, ensures easy ejection of the molded article from the mold, prevents the plastic film from deformation, enables frequent reuse of the plastic film, and has advantages including a reduced mold occupying time, an increased number of molding shots per unit time, and increased productivity.

The present invention is directed to a method for preparing a molded article of rigid polyurethane foam by using a mold consisting essentially of separable upper and lower mold sections mated to define a cavity therebetween, introducing a rigid polyurethane foam-forming raw material mainly comprising a polyhydroxy compound and a polyisocyanate compound into the cavity, and causing the raw material to foam and expand in the cavity to mold an article of rigid polyurethane foam. According to the feature of the invention, a film of polypropylene which is not bondable to the molded article is previously vacuum formed into a shape conformal to the cavity shape of at least one of the lower and upper mold sections, preferably at least the lower mold section. The vacuum formed film is closely set within the cavity and secured to the mold section outside the cavity. In this state, the rigid polyurethane foam-forming raw material is introduced into the cavity and on the film and caused to foam and expand in the cavity to mold an article of rigid polyurethane foam. After the completion of expansion of polyurethane foam, the molded article is lifted together with the film from the mold section. The molded article is stripped from the film to eject only the molded article from the mold without taking the entire film out of the mold. The once lifted film is returned to the original vacuum formed shape for replacing the film in the cavity.

In one preferred embodiment, a pneumatic chamber is disposed in the mold section, and the mold section is perforated with a plurality of air holes throughout its bottom wall. The pneumatic chamber is then in flow communication with the cavity via the plurality of air holes. A pneumatic pumping/suction means is connected to the pneumatic chamber through an air tube. In this embodiment, the step of lifting the molded article together with the film from the mold section is accomplished by actuating the pneumatic pumping/suction means in a discharge mode to feed air into the cavity through the air tube, the pneumatic chamber, and the air holes to fill air between the vacuum formed film and the mold section for urging the film upward or remote from the mold section. After the molded article is stripped from the film, the pneumatic pumping/suction means is switched to a suction mode to evacuate the air from between the film and the mold section through the air holes, the pneumatic chamber, and the air tube, thereby accomplishing the step of returning the once lifted film to the original vacuum formed shape for replacing the film in the cavity.

In another preferred embodiment, the mold section is provided with a pneumatic chamber in the mold section, an opening through its bottom wall and an ejector pin is inserted in the opening for vertical motion. The pneumatic chamber is in flow communication with the opening. A pneumatic suction means is connected to the pneumatic chamber through an air tube. Then the step of lifting the molded article together with the film from the mold section is accomplished by moving the ejector pin for urging the film upward or remote from the mold section. The ejector pin is retracted after the molded article is stripped from the film. Thereafter, the pneumatic suction means is switched to evacuate the air from between the film and the mold section through the space of between the opening and the ejector pin, the pneumatic chamber, and the air tube, thereby returning the once lifted film to the original vacuum formed shape for replacing the film in the cavity.

In a further preferred embodiment, the mold section has a bottom wall and an upright side wall. The side wall is outwardly tapered at a draft angle of at least 3 degrees for facilitating ejection of the molded article from the cavity.

The present invention has the following advantages. A polypropylene film is previously vacuum formed into a shape conformal to the cavity shape of the mold section. Since the vacuum forming permits the film to faithfully follow the three-dimensional complex pattern of the mold cavity without lifting, the film can be easily formed in conformity to the mold cavity. Secondly, the film is secured to the mold section at its periphery outside the cavity. This enables only the molded article be ejected from the mold after the completion of expansion of a rigid polyurethane foam-forming raw material. At this point, the film is lifted to an elevated position, but not entirely taken out of the mold. After the completion of the ejection step, the film can be returned to the original shape by a simple means, typically pneumatic suction. The film can be readily returned to the original shape since it is preformed into a shape conformal to the mold cavity. The film is thus reusable. The curing time can be effectively reduced. This leads to a reduced mold occupying time and an increased number of molding shots per unit time. Productivity improvement is expectable.

BRIEF DESCRIPTION OF THE DRAWINGS

These and further features of the present invention will be apparent with reference to the following description and drawings, wherein:

FIG. 1 is a schematic view of a mold used in one embodiment of the present method.

FIG. 2 illustrates the step of vacuum forming a polypropylene film.

DETAILED DESCRIPTION OF THE INVENTION

Figure 1A:
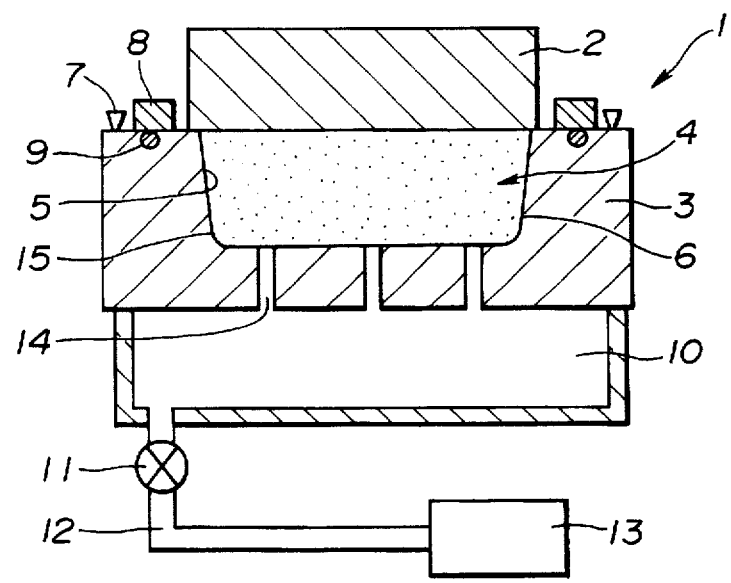
FIG. 1A illustrating a molding step.

Briefly stated, the present invention provides a method for preparing a molded article of rigid polyurethane foam by introducing a rigid polyurethane foam-forming raw material into a mold cavity where a polypropylene film is set in place which is previously vacuum formed in conformity to the cavity shape of the mold section (i.e., the upper mold section, the lower mold section, or the upper and lower mold sections, preferably at least the lower mold section), causing the raw material to foam and expand in place to mold an article of rigid polyurethane foam, and ejecting only the molded article from the mold.

The rigid polyurethane foam-forming raw material used herein is a composition comprising a polyhydroxy compound and a polyisocyanate compound as main components, and optionally, a catalyst, blowing agent, foam stabilizer, flame retardant and other agents. These components may be selected from well-known ones commonly used in the manufacture of conventional polyurethane foams and their amounts may be as usual.

Referring to FIG. 1, there is illustrated a mold used in one preferred embodiment of the present method. The mold generally designated at 1 includes upper and lower mold sections 2 and 3 which are mated in a separable manner. The lower mold section 3 is provided with a recess or cavity 4 in its upper central portion and has an upper end face surrounding the upper opening of the cavity 4. The upper mold section 2 is a cover which closes the upper opening of the lower mold cavity 4 when mated. When the upper and lower mold sections 2 and 3 are mated, the lower mold cavity 4 defines a mold cavity 5 with the lower surface of the upper mold section 2. In the lower mold section 3 is set a film 6 of polypropylene which is previously vacuum formed into a shape conformal or identical to the shape of the lower mold cavity 4. The preformed film 6 thus includes the cavity shaped portion and a flange surrounding it. The preformed film 6 at its flange is secured to the upper end face of the lower mold section 3 by pins 7. Additionally, a gasket 9 is buried in the upper end face of the lower mold section 3, and a retainer 8 is disposed to clamp the film flange with the gasket 9 to provide an air-tight seal between the film flange and the lower mold section 3. In this manner, the preformed film 6 is in close contact or fit with the lower mold cavity 4. It was found that this peripheral attachment of the film ensures that the film withstands several tens of molding and ejecting cycles without misalignment. Ejection operation is easy.

A box-shaped pneumatic chamber 10 is disposed below the lower mold section 3. An air tube 12 is at one end connected to the pneumatic chamber 10 through a pressure regulating valve 11 and at another end connected to an air pumping/suction means 13 in the form of a vacuum pump, for example. The bottom wall of the lower mold section 3 is perforated with a plurality of air holes 14 which provide flow communication between the pneumatic chamber 10 and the lower mold cavity 4.

Since the film 6 is made of polypropylene as mentioned above, it is smoothly separable from the molded article of rigid polyurethane foam and can be repeatedly used several tens of molding cycles. In general, plastic films which are separable from molded articles of rigid polyurethane foam include polyethylene and polypropylene films. Since polyethylene films tend to stretch and deform, they can be used only several molding cycles. In contrast, polypropylene films are smoothly separable from molded articles of rigid polyurethane foam and thus minimized in elongation and deformation upon separation, ensuring repetitive use beyond several tens of molding cycles. Unlike flexible polyurethane foam, rigid polyurethane foam undergoes buckling deformation, that is, failure when pressure forces are applied thereto. Upon ejection from the mold, the molded rigid polyurethane foam which has been expanded by internal reaction heat bears against the side surface of the mold cavity at a force of about 0.5 to 1 kg/cm$^2$. For this reason, the technique proposed by by the inventors herein in JP-A 164452/1995 is the only appropriate ejection technique although it requires to reset the film in the mold. Quite unexpectedly, the inventors have found that when the film is set in the mold in the above-mentioned manner, the molded article can be relatively smoothly lifted and ejected from the mold cavity by applying pneumatic pressure to the film from below. The prior art techniques had the following problems. Since the molded rigid polyurethane foam bears against the side surface of the mold cavity at a force as great as about 0.5 to 1 kg/cm², prior art attempts to displace the molded foam out of the mold cavity by pneumatic pressure failed. Forces acting among the molded rigid polyurethane foam, the film, and the mold cavity side wall provide resistance against extrusion or displacement of the molded foam, prohibiting ejection from the mold cavity. When air is fed for ejection, the pneumatic pressure would be either short to displace the molded foam from the mold cavity or so high that the pressure force might cause the film to rupture or break and sometimes, to inflate and hole. The method of the present invention enables smooth ejection of the molded foam from the mold cavity.

Preferably, the polypropylene film has a gage of about 0.3 to 1.0 mm, especially about 0.3 to 0.6 mm. A film of less than 0.3 mm in gage would be less strong and can fail upon molding. A film of more than 1.0 mm in gage would have a greater tolerance which requires the mold to be manufactured to a little larger dimensions, which in turn, adversely affects the film to be deformed upon ejection. Where molded articles have a complex shape, separation of such a thick film from the polyurethane foam would be difficult.

The polypropylene film must be previously vacuum formed to a shape conformal to at least one of the lower and upper mold cavities, preferably at least the lower mold cavity. If the film is not previously formed, the film will not closely follow and resume the cavity shape after rigid polyurethane foam is expanded, molded and ejected. If the film is formed to the cavity shape by press molding rather than vacuum forming, the formed film would have a shape which is not closely conformal to the lower mold cavity and leaves some interstices. This is because in press molding, the film is locally strongly embossed at corners of the male die and thus shaped as if it were permanently deformed. Additionally, the film becomes liable to rupture at the corners and less durable. Particularly when the mold cavity has a deeply depressed shape, the thin film is slid and stretched across a narrow gap so that the film becomes too thin and can be ruptured in some cases. Although force must be uniformly applied to the film, it becomes unlikely due to the reduced gage of the film that the upper die presses the film uniformly. That is, the upper die presses the film at a locally varying strength. Then the shaped film would vary in gage or would not closely fit with the mold cavity shape.

Figure 2A:
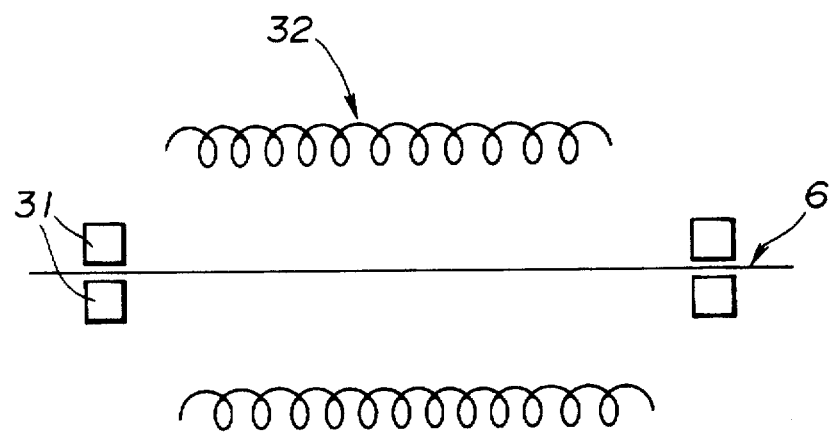
FIG. 2A showing the step of preheating a film.
Figure 2B:
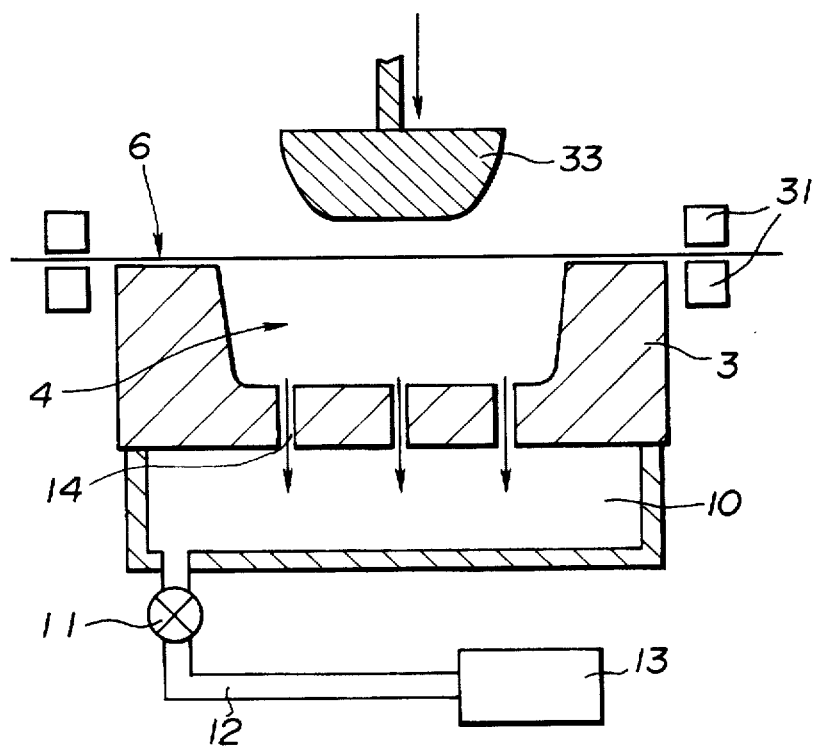
FIG. 2B showing vacuum forming.

The vacuum forming technique may be any conventional well-known one. In the practice of the invention, it is preferred that the polypropylene film is heated at about 180° to 200° C. for about 15 to 20 seconds before vacuum forming. Vacuum forming may be carried out using a lower mold section similar to that used in foam molding although the invention is not limited thereto. The procedure of vacuum forming a film using a lower mold section as shown in FIG. 2 is described below. A generally rectangular polypropylene film 6 is clamped at four corners by clamps 31 as shown in FIG. 2A. The film 6 is heated at about 180° to 200° C. for about 15 to 20 seconds by heaters 32 disposed on opposite sides of the film. Then, the hot film 6 is positioned on a lower mold section 3 as shown in FIG. 2B, by clamping as described above. From this state, the air pumping/suction means 13 is actuated to evacuate the pneumatic chamber 10 and the lower mold cavity 4 to a predetermined vacuum. Then the hot film 6 is uniformly drawn against the lower mold cavity surface due to the differential pressure between the vacuum in the lower mold cavity 4 and the atmospheric pressure. In this way, the film is formed in conformity to the shape of the lower mold cavity 4. Since the atmospheric pressure serves for isotropic forming of the film, the film will faithfully follow the cavity shape even when it is a three-dimensional complex shape. The film can be formed without leaving "dry spots." It is to be noted that since some shrinkage can occur after the polypropylene film is shaped by vacuum forming, most preferably a mold having slightly larger dimensions than the foam mold is used for vacuum forming for compensating for a shrinkage allowance.

Particularly when the mold cavity has a deeply depressed shape, the film can be excessively stretched at a central portion so that it may be ruptured. In such a case, the film is forced into the cavity to some extent by an auxiliary plug 33 as shown in FIG. 2B before starting vacuum forming of the film as described above. It is noted that the auxiliary plug 33 need not closely mate with the lower mold cavity unlike a press punch. Vacuum forming is satisfactorily assisted when an auxiliary plug of hemispherical shape is used to force the film partially into the mold cavity.

Figure 1B:
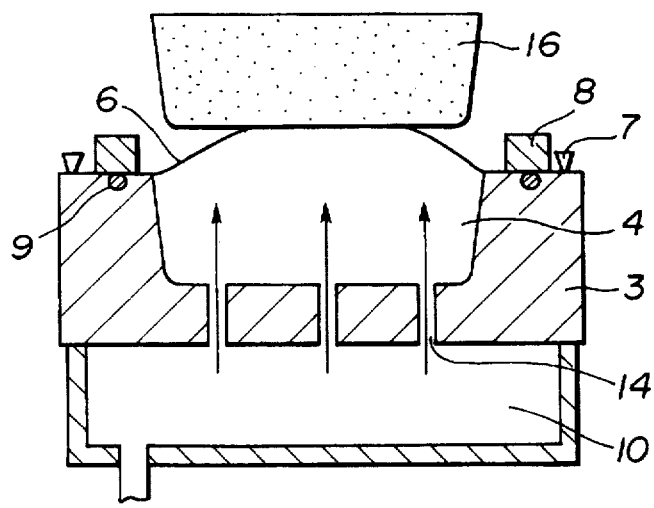
FIG. 1B illustrating an ejection step.

Referring to FIG. 1 again, it is now described how to prepare a molded article of rigid polyurethane foam using the mold 1. After the vacuum formed polypropylene film 6 is set on the lower mold section 3, a shot of rigid polyurethane foam-forming raw material is fed on the film 6 within the cavity 5. The upper mold section 2 is mated with the lower mold section 3 and clamped thereto. The raw material is caused to foam and expand into a molded article 16 as shown in FIG. 1A. After the completion of expansion of polyurethane foam, the upper mold section 2 is opened. As shown in FIG. 1B, the pneumatic pumping/suction means 13 is actuated in a discharge or pressure mode to feed air into the cavity through the air tube 12, pneumatic chamber 10, and air holes 14 as shown by arrows to fill air between the vacuum formed film 6 and the lower mold section 3 for lifting the molded article 16 upward together with the film 6. At this point, since only the flange of the film 6 is secured to the lower mold section 3 by the retainer 8, the pneumatic pressure elevates the center portion of the film 6. Because the film and the molded article are lifted together by the pneumatic pressure, the film is spontaneously stripped from the molded article at least partially. A suitable volume of air is fed to lift the molded article 16 to a predetermined elevation as shown in FIG. 1B. Then only the molded article 16 is carried away. The pneumatic pressure fed for ejection is preferably at least 0.5 kg/cm², more preferably 1 to 5 kg/cm². It was empirically found that most molded articles of different shapes could be ejected by increasing the pneumatic pressure to about 5 kg/cm² although the necessary pneumatic pressure varies with the shape and size of a particular molded article.

The molded article is preferably tapered for facilitating its ejection from the mold cavity, preventing defects such as dents and flaws upon lifting, and reducing resisting forces. In other words, the side wall of the mold cavity is preferably inclined at a draft angle of at least 3°, especially 3° to 5° although the angle varies with the dimensions of an article to be molded.

Figure 1C:
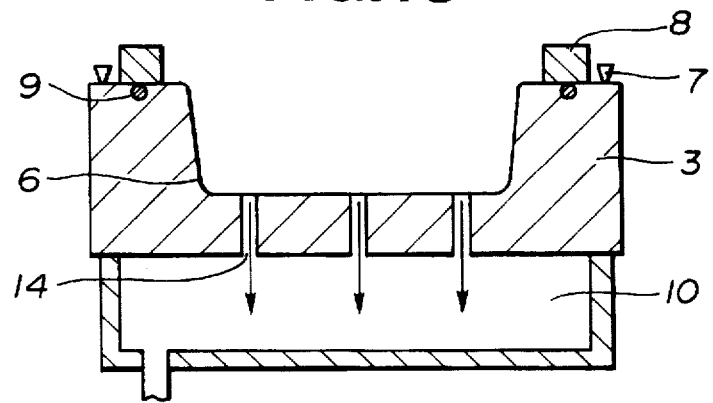
FIG. 1C illustrating a film replacing step.

After the molded article is removed from the film, the pneumatic pumping/suction means 13 is switched to a suction mode to evacuate the air from between the film 6 and the lower mold section 3 through the air holes 14, pneumatic chamber 10, and air tube 12, thereby returning the once lifted film 6 to the original vacuum formed shape for replacing the film in the lower mold cavity 4 as shown in FIG. 1C. The film is ready for reuse. Therefore, the present method enables to efficiently reduce the curing time, resulting in a reduced mold occupying time and an increased number of molding shots per unit time. Productivity is thus increased. The first embodiment using a mold as shown in FIG. 1 eliminates a need for an extra step of returning and replacing the film after ejection, ensuring an efficient method. Since the molded article as a whole can be uniformly lifted by pneumatic pressure, no excessive force is applied to the molded article. This permits the curing time at 80° C.±10° C. until ejection to be reduced from about 6 minutes to about 4 minutes. Then the mold occupying time can be reduced to increase the number of molding cycles per unit time by about 30%, leading to increased productivity.

Figure 3:
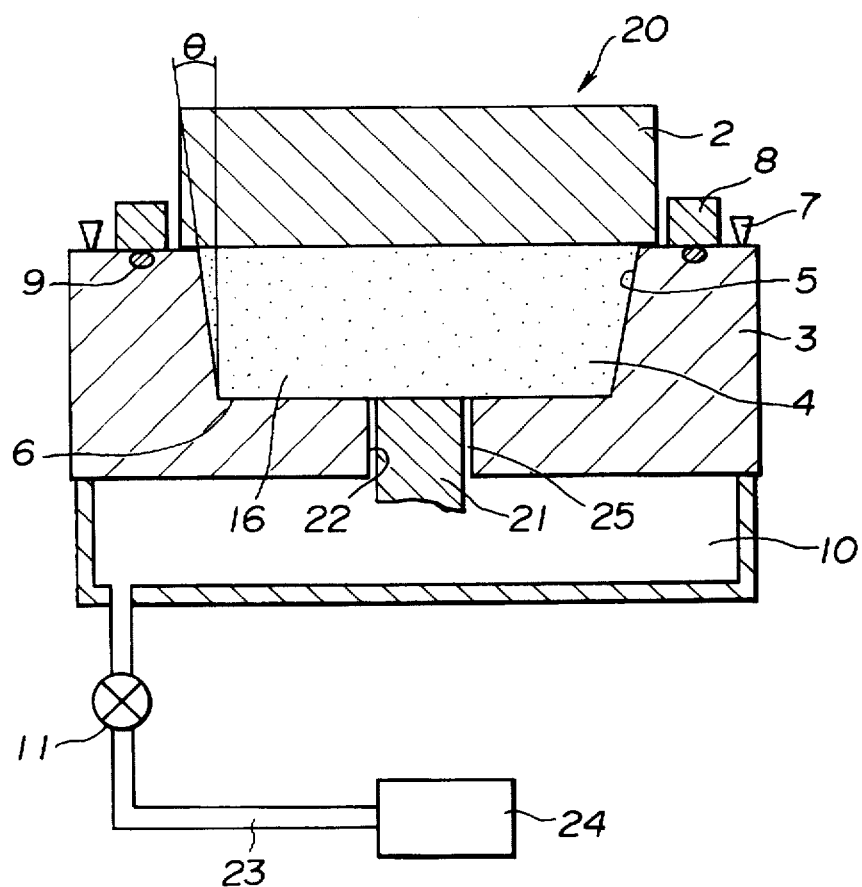
FIG. 3 is a schematic cross-sectional view of a mold used in another embodiment of the present method.

FIG. 3 illustrates a mold 20 according to another embodiment of the invention. The mold 20 is approximately the same as mold 1 of FIG. 1 except for the following difference. The lower mold section 3 is provided with a center opening 22 through its bottom wall and an ejector pin 21 is inserted in the opening 22 for vertical motion. The lower mold section 3 is also provided with a pneumatic chamber 10 which is in flow communication with the opening 22. A pneumatic suction pump 24 is connected to the pneumatic chamber 10 through an air tube 23. The space 25 between the opening 22 and the ejector pin 21 is an air flow route, and therefore it is not necessary to form air holes as in FIG. 1, although, if required, some air holes may be formed.

In this embodiment, at the end of molding, the upper mold section 2 is opened and the ejector pin 21 is moved upward to lift the molded article 16 together with the film 6. Since the film 6 is secured only at its peripheral flange to the lower mold section 3 by the retainer 8, only the molded article 16 can be ejected from the mold. The ejector pin 21 is moved downward, that is, retracted after the molded article is stripped from the film. The film 6 is returned to the original shape and replaced in the lower mold cavity by vacuum suction as in the first embodiment. That is, the pneumatic suction pump 24 is actuated to evacuate the air from between the film and the mold section through the space 25 between the opening 22 and the ejector pin 21, the pneumatic chamber 10 and the air tube 23. Although only one ejector pin 21 is shown in FIG. 3, a plurality of ejector pins may be used if desired. In the second embodiment using an ejector pin, the pneumatic pressure for ejection of the molded article as in the first embodiment may be combined with the ejector pin operation by using the pneumatic pumping/suction pump. Any desired drive mechanism (not shown) may be used for driving the ejector pin. For example, a pneumatic drive mechanism is useful.

The use of the ejector pin eliminates supply of air for providing a pneumatic pressure to lift the film and the molded article, resulting in a simpler process. The size and number of the ejector pin must be carefully selected to provide a sufficient surface pressure so that the molded article of rigid polyurethane foam may not be deformed when it is extruded.

The molded article is smoothly extruded from the mold cavity if the molded article is properly tapered. As shown in FIG. 3, the lower mold cavity 4 is defined by a bottom and an upright side wall extending from the periphery of the bottom. The side wall is preferably inclined outward from its junction with the bottom at a draft angle θ of at least 3°, more preferably 3° to 5° with respect to a vertical line.

It is noted that when the plastic film and the molded article of rigid polyurethane foam are ejected from the mold, the molded article can be extruded simply by moving the ejector pin upward if the film is not secured to the mold. In this case, however, additional steps of separating the film from the molded article and then replacing the film in the mold are required. Moreover, the film is reversed in shape upon separation and must be returned to the original shape. The present method eliminates these steps.

In FIG. 3, the air holes as shown in FIG. 1 may be provided so that the pneumatic pressure for ejection of the molded article as in the first embodiment is combined with the ejector pin operation for ejection of the mold article. In this case, the air between the film and the mold section (cavity surface) is evacuated through the air holes and the space between the opening and the ejector pin.

Although some preferred embodiments have been described, the present invention is not limited thereto. Many modifications and variations may be made to the illustrated embodiments in the light of the above teachings. For example, although the vacuum formed polypropylene film is set on only the lower mold section in the embodiment shown in FIG. 1 or FIG. 3, a similar polypropylene film may also be set on the upper mold section. Particularly when the upper mold section has a cavity of complex shape, it is preferred to set on the upper mold section a polypropylene film which has been vacuum formed to a shape conformal to the upper mold cavity shape. If required, only the upper mold is provided with the previously vacuum molded polypropylene film. In this connection, the upper mold section may be provided with a pneumatic chamber as shown in FIG. 1 or FIG. 3. Also, in the embodiment of FIG. 1 or FIG. 3 wherein no film is set on the upper mold section, a mold release agent may be applied to the upper mold section or the upper mold section may be lined with a fluororesin coating. The number and size of air holes through the mold section wall may be suitably chosen. It is therefore to be understood that within the scope of the appended claims, the invention may be practiced otherwise than as specifically described.

The molded articles of rigid polyurethane foam produced by the present method are useful as automotive interior articles and other industrial articles. They are especially useful as shock absorbers to be attached inside the door trim of automobiles for absorbing collision energy for protecting drivers and passengers.

EXAMPLE

Examples of the present invention are given below by way of illustration and not by way of limitation.

Examples 1-2 & Comparative Examples 1-4

Six molded articles of rigid polyurethane foam were prepared using a mold as shown in FIG. 1 in combination with a polypropylene film, and a rigid polyurethane foam-forming raw material.

The raw material contained, in parts by weight, 100 parts of a polyhydroxy compound, 164 parts of a polyisocyanate compound, 2 parts of a foam stabilizer, 10 parts of a flame retardant, 2.4 parts of a blowing agent, 1 part of a catalyst, and 30 parts of a powder. The polyhydroxy compound was a polyether polyol GR36B (OH equivalent 420) commercially available from Takeda Chemical Industries K.K. The polyisocyanate compound was crude diphenylmethane diisocyanate 44V20 commercially available from Sumitomo Bayer Urethane K.K. The foam stabilizer was a silicon foam stabilizer L-5430 commercially available from Nihon Unicar K.K. The flame retardant was TMCPP commercially available from Daihachi Chemical K.K. The blowing agent was water. The catalyst was a 1:1 mixture of Kaolyzer No. 1 (tetramethylhexamethylenediamine commercially available from Kao K.K.) and 33% dipropylene glycol solution of triethylene diamine. The powder was heavy calcium carbonate Whiton SB commercially available from Shiraishi Calcium K.K.

The polypropylene (PP) film had a gage of 0.3 to 1.0 mm. Molding and ejection conditions are shown in Table 1.

Figure 4:
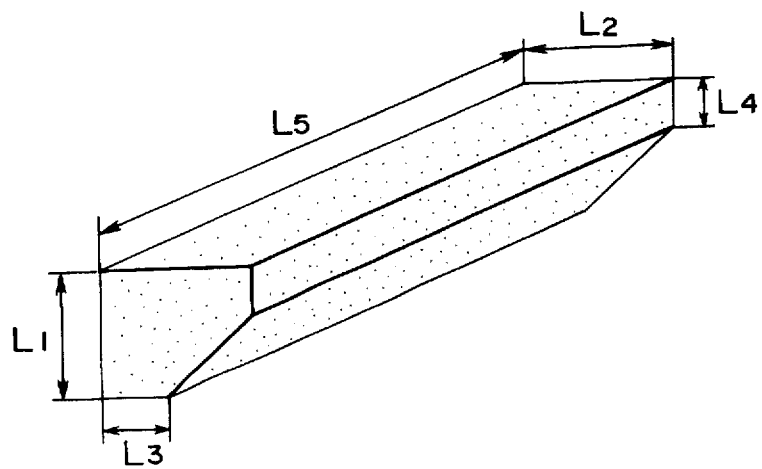
FIG. 4 is a perspective view of a molded article.

The molded articles are shown in the perspective view of FIG. 4 as having dimensions L2=90 mm, L3=50 mm, L4=40 mm, and L5=270 mm. Dimension L1 was changed among 80 mm, 70 mm, 60 mm, 40 mm and 20 mm.

The molded articles were evaluated for the time until ejection, ease of operation upon ejection, and whether extra steps to separate the polypropylene film from the molded article and to replace the film in the mold are necessary. The results are also shown in Table 1.

TABLE 1

|  | E1 | E2 | CE1 | CE2 | CE3 | CE4 |
|---|---|---|---|---|---|---|
| Mold draft angle θ | 3° | 5° | 0° | 0° | 0° | 3° |
| Vacuum forming of PP film | yes | yes | no | no | yes | yes |
| Pneumatic ejection | yes | yes | no | no | no | no |
| Time until ejection, min. | 4 | 4 | 12 | 6 | 6 | 6 |
| Ease of ejection | ejectable, but difficult from deep cavity (OK at L1 = 20 to 60 mm, NG at L1 = 70 mm) | ejectable from deep cavity (OK even at L1 = 70 or 80 mm) | ejectable with the aid of auxiliary jig in ejection direction | unejectable in 6 min. | force needed to lift the film; inefficient operation | ejectable, but difficult from deep cavity (OK at L1 = 20 to 60 mm) |
| Removal of PP film from molded article and replacement | unnecessary; efficient operation | unnecessary; efficient operation | — | — | necessary; cumbersome and less productive | necessary; cumbersome and less productive |

The present invention offers the following advantages. (1) It is easy to eject a molded article of rigid polyurethane foam from a mold. (2) Separation of the molded article from the polypropylene film requires no extra step. (3) The film is not significant deformed upon ejection. (4) Since the film is previously vacuum formed, it can readily resume the original shape with little special step taken therefor. (5) The pneumatic ejection of the molded article can reduce the curing time until ejection by about 30%. (6) Even when the ejector pin is used for ejection, the film intervening between the molded article and the ejector pin prevents polyurethane from entering the gap of the ejector pin and air holes, eliminates a need to clean the gap and air holes. Further, the use of the ejector pin eliminates supply of air for a pneumatic pressure to lift the film and the molded article, resulting in the elimination of an apparatus for supplying air to the mold on a manufacturing line for a rigid polyurethane foam mold articles. The cost merit is high. (7) The mold occupying time can be reduced to increase the number of molding shots per unit time, contributing to productivity improvement. (8) The method eliminates the cumbersome, contaminative operation of applying a release agent to the mold. (9) An interior or exterior liner may be joined to the foam article as molded because of the eliminated need for removal of the mold release agent from the molded article.

We claim:

1. A method for manufacturing a molded article of rigid polyurethane having a thickness of 0.3 to 1.0 mm foam using a mold consisting essentially of separable upper and lower mold sections mated to define a cavity therebetween, comprising the steps of:

vacuum forming a film of polypropylene which is not bondable to the molded article into a shape conformal to the cavity shape of at least one of the lower and upper mold sections, closely setting the previously vacuum formed film within said cavity and securing the film to a mold section outside the cavity, introducing a rigid polyurethane foam-forming raw material mainly comprising a polyhydroxy compound and a polyisocyanate compound into said cavity and on the film, causing the raw material to foam and expand in said cavity to mold an article of rigid polyurethane foam, lifting the molded article together with the film from said mold section, stripping the molded article from the film to eject only the molded article from the mold without taking the entire film out of the mold, and returning the once lifted film to the original vacuum formed shape for replacing the film in said cavity.

2. The method of claim 1 wherein a pneumatic chamber is disposed in said mold section in flow communication with said cavity via a plurality of air holes through said mold section, and a pneumatic pumping/suction means is connected to said pneumatic chamber through an air tube, the step of lifting the molded article together with the film from said mold section includes actuating said pneumatic pumping/suction means in a discharge mode to feed air into the cavity through the air tube, the pneumatic chamber, and the air holes to fill air between the vacuum formed film and said mold section for urging the film remote from the mold section, and the step of returning the once lifted film to the original vacuum formed shape for replacing the film in said cavity includes switching said pneumatic pumping/ suction means to a suction mode to evacuate the air from between the film and the mold section through the air holes, the pneumatic chamber, and the air tube.

3. The method of claim 2 wherein the mold section has a bottom wall and an upright side wall extending from the periphery of the bottom wall to define a portion of said cavity, and the side wall is outwardly inclined from its junction with the bottom wall at a draft angle of at least 3 degrees with respect to a vertical line for facilitating ejection of the molded article from the cavity.

4. The method of claim 1 wherein a pneumatic chamber is disposed in said mold section in flow communication with said cavity via an opening through said mold section, an ejector pin is inserted in the opening for vertical motion, and a pneumatic suction means is connected to said pneumatic chamber through an air tube, the step of lifting the molded article together with the film from said mold section includes moving the ejector pin for urging the film remote from the mold section, the step of retracting the ejector pin after the molded article is stripped from the film, and the step of returning the once lifted film to the original vacuum formed shape for replacing the film in said cavity includes switching said pneumatic suction means to evacuate the air from between the film and the mold section through the space between the opening and the ejector pin, the pneumatic chamber and the air tube.

5. The method of claim 1 wherein the mold section has a bottom wall and an upright side wall extending from the periphery of the bottom wall to define a portion of said cavity, and the side wall is outwardly inclined from its junction with the bottom wall at a draft angle of at least 3 degrees with respect to a vertical line for facilitating ejection of the molded article from the cavity.

6. The method of claim 1, further including the step of heating said film of polypropylene prior to vacuum forming.

7. The method of claim 1, wherein during said lifting step a center portion of said film is elevated above said mold section while maintaining attachment of said film to said mold section outside the cavity.

8. A method for manufacturing a molded article of rigid polyurethane foam using a mold consisting essentially of separable upper and lower mold sections mated to define a cavity therebetween, comprising the steps of:

vacuum forming a film of polypropylene which is not bondable to the molded article into a shape conformal to the cavity shape of at least one of the lower and upper mold sections, closely setting the previously vacuum formed film within said cavity and securing the film to a mold section outside the cavity, introducing a rigid polyurethane foam-forming raw material mainly comprising a polyhydroxy compound and a polyisocyanate compound into said cavity and on the film, causing the raw material to foam and expand in said cavity to mold an article of rigid polyurethane foam.

lifting the molded article together with the film from said mold section, stripping the molded article from the film to eject only the molded article from the mold without taking the entire film out of the mold, returning the once lifted film to the original vacuum formed shape for replacing the film in said cavity, wherein a pneumatic chamber is disposed in said mold section in flow communication with said cavity via an opening through said mold section, an ejector pin is inserted in the opening for vertical motion, and a pneumatic suction means is connected to said pneumatic chamber through an air tube, the step of lifting the molded article together with the film from said mold section includes moving the ejector pin for urging the film remote from the mold section, the step of retracting the ejector pin after the molded article is stripped from the film, and the step of returning the once lifted film to the original vacuum formed shape for replacing the film in said cavity includes switching said pneumatic suction means to evacuate the air from between the film and the mold section through the space between the opening and the ejector pin, the pneumatic chamber and the air tube.

9. The method of claim 8 wherein the mold section has a bottom wall and an upright side wall extending from the periphery of the bottom wall to define a portion of said cavity, and the side wall is outwardly inclined from its junction with the bottom wall at a draft angle of at least 3 degrees with respect to a vertical line for facilitating ejection of the molded article from the cavity.

10. The method of claim 8, wherein said film of polypropylene has a thickness in the range of 0.3 to 1.0 mm.

11. The method of claim 8, further including the step of heating said film of polypropylene prior to vacuum forming.

12. The method of claim 8, wherein during said lifting step a center portion of said film is elevated above said mold section while maintaining attachment of said film to said mold section outside the cavity.

* * * * *